United States Patent [19]
Lew et al.

[11] Patent Number: 5,359,901
[45] Date of Patent: * Nov. 1, 1994

[54] METHOD FOR MEASURING MASS FLOW RATE

[76] Inventors: Hyok S. Lew; Yon S. Lew, both of 7890 Oak St., Arvada, Colo. 80005

[*] Notice: The portion of the term of this patent subsequent to Sep. 10, 2009 has been disclaimed.

[21] Appl. No.: 27,450

[22] Filed: Mar. 8, 1993

Related U.S. Application Data

[63] Continuation-in-part of Ser. No. 643,420, Jan. 22, 1991, Pat. No. 5,295,398.

[51] Int. Cl.$^5$ .............................................. G01F 1/84
[52] U.S. Cl. .................................................. 73/861.38
[58] Field of Search ........................ 73/861.37, 861.38

[56] References Cited

U.S. PATENT DOCUMENTS

5,123,287 6/1992 Lew .................................. 73/861.38

Primary Examiner—Herbert Goldstein

[57] ABSTRACT

A method for determining mass flow rate of media moving through at least one conduit under a flexural vibration comprises obtaining two alternating electrical signals respectively representing the flexural vibration of the conduit at two different sections of the conduit, and determining mass flow rate of media as a function of the ratio of a value of one of the two alternating electrical signals measured at an instant when the other of the two alternating electrical signals reaches a zero value to the amplitude of said one of the two alternating electrical signals.

10 Claims, 4 Drawing Sheets

METHOD FOR MEASURING MASS FLOW RATE

This patent application is a continuation-in-part application to patent application Ser. No. 07/643,420, filed Jan. 22, 1991, now U.S. Pat. No. 5,295,398, and patent application entitled "Electronic Method for Measuring Mass Flow Rate" mailed on Feb. 8, 1993, that has not been assigned a serial number at the present time.

FIELD OF INVENTION

The present invention teaches methods, for determining mass flow rate of media moving through a single conduit under a flexural vibration, or through a pair of conduits under a relative flexural vibration.

BACKGROUND OF INVENTION

In the conventional method for measuring mass flow rate of media moving through a single conduit under a flexural vibration or through a pair of conduits under a relative flexural vibration therebetween, the phase angle difference between two electrical signals respectively representing the flexural vibration of the conduit at two sections located symmetrically about the midsection of the conduit is measured and the mass flow rate of the media is determined from the phase angle difference by using an empirically determined mathematical relationship therebetween, or the mass flow rate is determined as a function of other parameters directly or indirectly related to the phase angle difference.

BRIEF SUMMARY OF INVENTION

The primary object of the present invention is to provide a method for determining mass flow rate of media moving through a single conduit under a flexural vibration or through a pair of conduits under relative flexural vibration therebetween as a function of a normalized value of the first alternating electrical signal representing the flexural vibration of the conduit at a first section thereof, which normalized value of the first alternating electrical signal is measured at an instant when a second alternating electrical signal representing the flexural vibration of the conduit at a second section thereof reaches a zero value.

Another object is to provide a method for determining the mass flow rate of media as a function of a differential combination of a product between the normalized first alternating electrical signal and the time derivative of the normalized second alternating electrical signal and a product between the normalized second electrical signal and the time derivative of the normalized first alternating electrical signal.

A further object is to provide a method for determining the mass flow rate of media as a function of the amplitude of a differential combination of the absolute values of the normalized first and second alternating electrical signals.

Yet another method is to provide a method for measuring the mass flow rate of media as a function of a differential combination of squares of the normalized first and second alternating electrical signals.

These and other objects of the present invention will become clear as the description thereof progresses.

BRIEF DESCRIPTION OF FIGURES

The present invention may be described with a greater clarity and specificity by referring to the following figures.

DESCRIPTION OF METHODS

Figure 1:
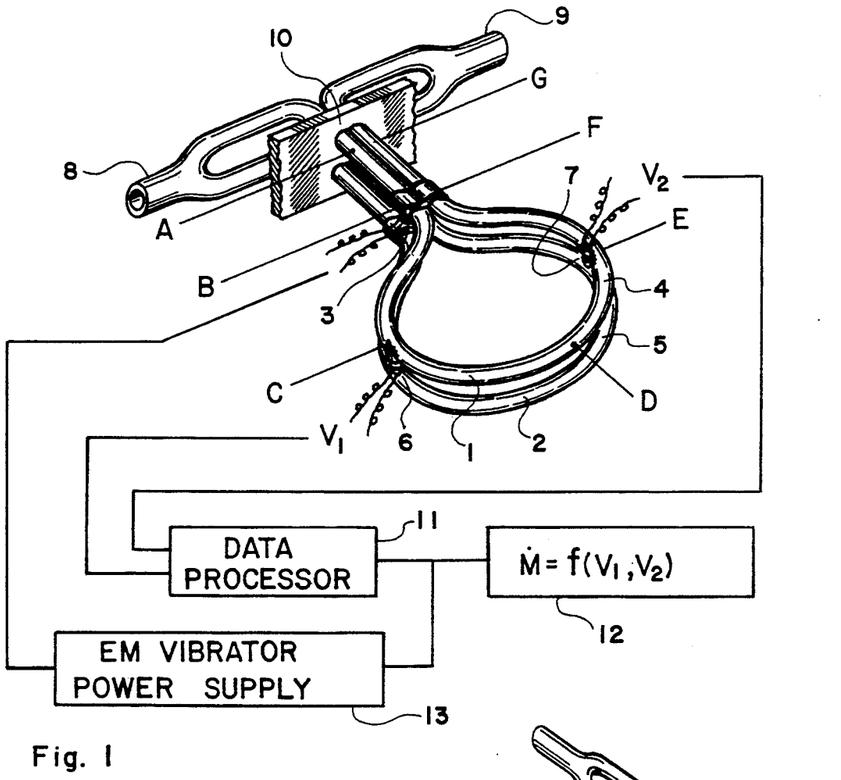
FIG. 1 illustrates an embodiment of the mass flowmeter with a pair of conduits under a symmetric primary flexural vibration generated by an electromagnetic vibrator and an antisymmetric secondary flexural vibration generated by the convective inertia force of media moving therethrough, and the electronic circuits processing the data yielding numerical value of the mass flow rate of media moving through the pair of conduits.

In FIG. 1 there is illustrated a typical mechanical embodiment of the mass flowmeter, that operates on the principles taught by the methods of the present invention. The mass flowmeter comprises a pair of conduits 1 and 2 disposed in a parallel and superimposed relationship therebetween, and flexurally vibrated relative to one another by an electromagnetic vibrator 3. A pair of motion sensors 6 and 7 measures the relative flexural vibration between the pair of conduits 1 and 2 at two sections thereof respectively located on the two opposite sides of the midsection of the combination of the pair of conduits 1 and 2. The pair of conduits 1 and 2 respectively including looped midsections 4 and 5 of 360 degree loop angle connects an inlet port 8 and an outlet port 9 to one another in a parallel connection as shown in the particular illustrative embodiment or in a series connection wherein the inlet leg of the first conduit 1 is connected to the inlet port 8, the outlet leg of the first conduit 1 is connected to the inlet leg of the second conduit 2, and the outlet leg of the second conduit is connected to the outlet port 9. Each of the pair of conduits 1 and 2 has two generally straight end sections anchored to a supporting structure 10 at the roots A and G thereof and mechanically tied together at the overhanging extremities B and F by a mechanical clamping or coupling, and the looped midsection 4 or 5. The two opposite halves of the electromagnetic vibrator 3 functioning in an action-reaction relationships are respectively secured to the two mechanical clamps respectively coupling the two pairs of the end sections of the two conduits 1 and 2. The best result is obtained when the combination of the pair of conduits 1 and 2 has a construction symmetric about the midsection D of the combination thereof, and the two motion sensors 6 and 7 are respectively located at two sections C and E located symmetrically about the midsection D, while the methods of the present invention are also compatible with two motion sensors located asymmetrically about the midsection D. Two electrical signals respectively generated by the two motion sensors 6 and 7 and respectively representing the relative flexural vibration between the two conduits at the sections C and E are supplied to a data processor 11, which analyze the two electrical signals by one of the methods taught by the present invention and determines the mass flow rate of media moving through the conduits 1 and/or 2 as a function of the two electrical signals. A data display 12 provides numerical value of the mass flow rate of media determined by the data processor 11. The data processor 11 may also provide the information on the natural frequency of the relative flexural vibration of the pair of conduits 1 and 2 and the phase relationship relative to the electromagnetic vibratory force imposed by the electromagnetic vibrator 3, whereby the electromagnetic vibrator power supply 13 energizes the electromagnetic vibrator 3 in such a way that the relative flexural vibration between the pair of conduits 1 and 2 occurs at the natural frequency thereof. The methods of the present invention defining the operating principles of the data processor 11 will be described in conjunction with FIGS. 6 and 16. It should be understood that the pair of conduits 1 and 2 may be coupled to one another at the midsection D in a revised version of the illustrated embodiment, and that the electromagnetic vibrator 3 may be relocated to the midsection D in another revised version. It should be also understood that one of the pair of conduits 1 and 2 can be omitted and one of the two opposite halves of the electromagnetic vibrator 3, that was originally anchored to the now omitted conduit, can be anchored to a supporting structure. The abovementioned modifications of the structural embodiment of the mass flowmeter shown in FIG. 1 can be also applied to other embodiments shown in FIGS. 2-5.

Figures 2, 3:
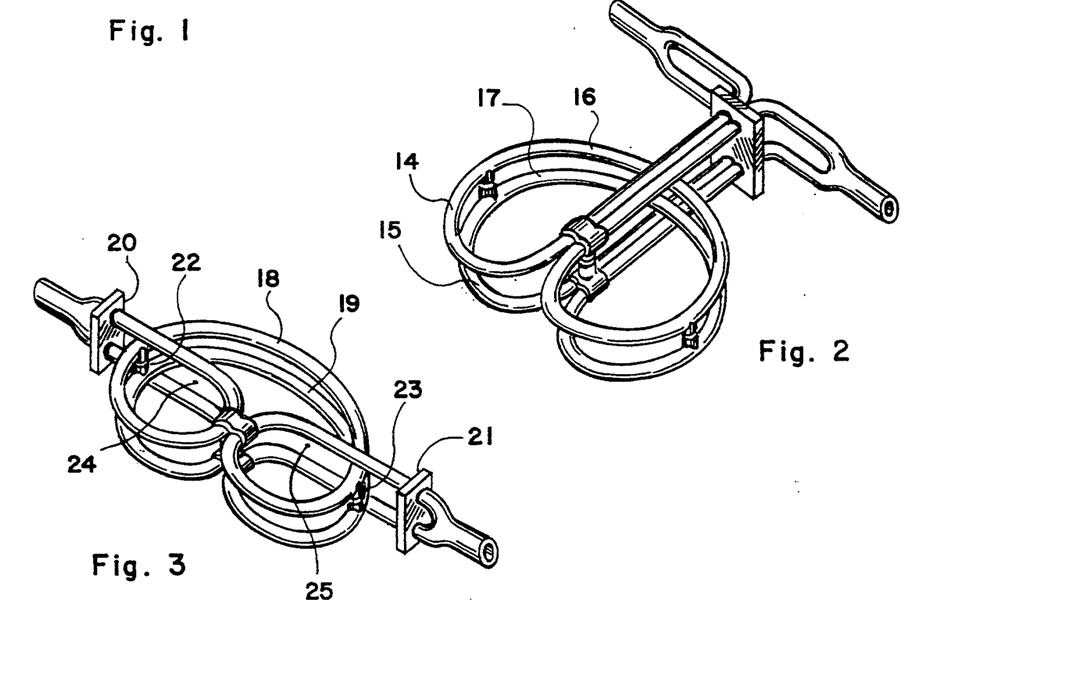
FIG. 2 illustrates another embodiment of the mass flowmeter operating in the same mode as that shown in FIG. 1.
FIG. 3 illustrates a further embodiment of the mass flowmeter operating in the same mode as that shown in FIG. 1.

In FIG. 2 there is illustrated another embodiment of the mechanical embodiment of the mass flowmeter comprising a pair of conduits 14 and 15, which embodiment results when the looped midsections 16 and 17 of the pair of conduits 14 and 15 respectively connected to the over-hanging and clamped extremities of the two pairs of the generally straight end sections are made to extend towards the anchored extremities of those generally straight end sections of the conduits 14 and 15 in contrast to the embodiment shown in FIG. 1, wherein the looped midsection extend away from the anchored extremities of the two conduits 1 and 2. While the looped midsections 16 and 17 are disposed intermediate the two pairs of the generally straight end sections of the conduits 14 and 15 in the particular illustrated embodiment, the structural arrangement can be revised in such a way that the two looped midsections 16 and 17 straddle one or both pairs of the generally straight end sections of the conduits, which structural revision can be also applied to the embodiment shown in FIG. 3.

In FIG. 3 there is illustrated a further mechanical embodiment of the mass flowmeter comprising a pair of conduits 18 and 19 with two opposite root sections thereof respectively secured by two anchoring brackets 20 and 21. It is readily recognized that this mechanical embodiment results when the two generally straight end sections of each of the pair of conduits 14 and 15 shown in FIG. 2, which are disposed in a side-by-side parallel arrangement, are bent away from one another into a new arrangement wherein the two opposite end sections now extend towards one another from the respective anchored extremities thereof. It should be understood that the motion sensors 22 and 23 measuring the relative flexural vibration at the two opposite halves of the combination of the looped midsections of the conduits 18 and 19 may be relocated to a new locations 24 and 25, whereby the pair of relocated motion sensors now measure the relative flexural vibration at the overhanging sections of the two opposite pairs of the generally straight end sections of the conduits.

Figures 4, 5:
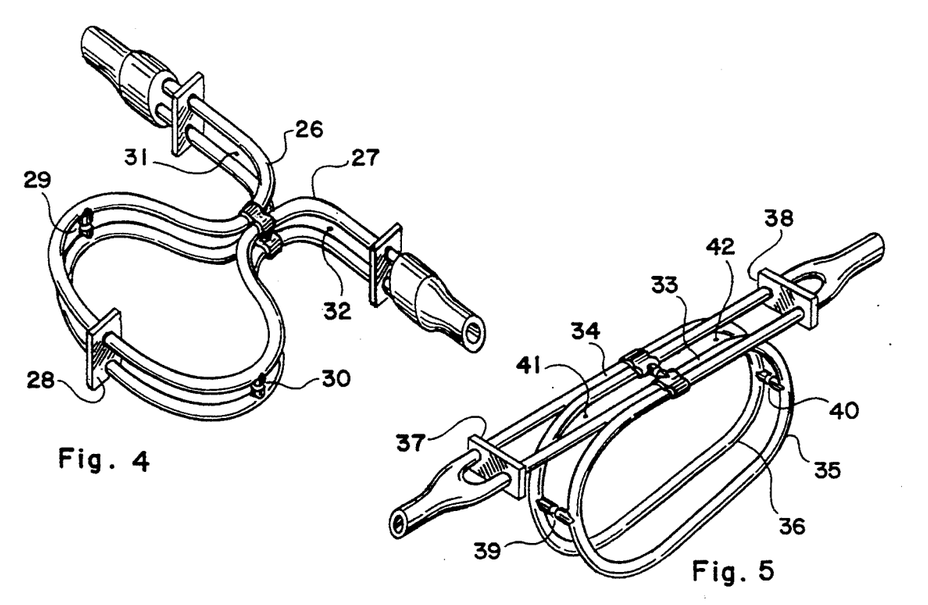
FIG. 4 illustrates yet another embodiment of the mass flowmeter operating in the same mode as that shown in FIG. 1.
FIG. 5 illustrates yet a further embodiment of the mass flowmeter operating in the same mode as that shown in FIG. 1.

In FIG. 4 there is illustrated yet another mechanical embodiment of the mass flowmeter comprising a pair of conduits 26 and 27, which embodiment results when the two generally straight opposite end sections included in each of the pair of conduits shown in FIG. 1 are bent away from one another into a new arrangement wherein the two opposite end sections now extend towards one another from the respective anchored extremities thereof. The bracket 28 mechanically tying together the midsections of the pair of conduits 26 and 27 may be included or omitted. The two motion sensors 29 and 30 may be relocated to new positions 31 and 32.

In FIG. 5 there is illustrated yet a further mechanical embodiment of the mass flowmeter comprising a pair of conduits 33 and 34 respectively including the looped midsection 35 and 36 of 360 degree loop angle, wherein the two generally straight opposite end sections of each of the pair of conduits are disposed tangentially to the respective 360 degree looped midsection, and anchored respectively by a pair of anchoring brackets 37 and 38 at the two opposite extremities of the pair of conduits 33 and 34. The two motion sensors 39 and 40 may be relocated to new positions 41 and 42.

Figure 6:
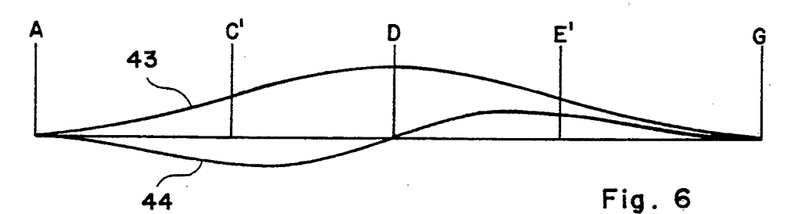
FIG. 6 illustrates the distributions of the symmetric primary flexural vibration of the conduit generated by the electromagnetic vibrator and the antisymmetric secondary flexural vibration of the conduit generated by the convective inertia force of the media moving through the individual conduit.
Figures 7, 8:
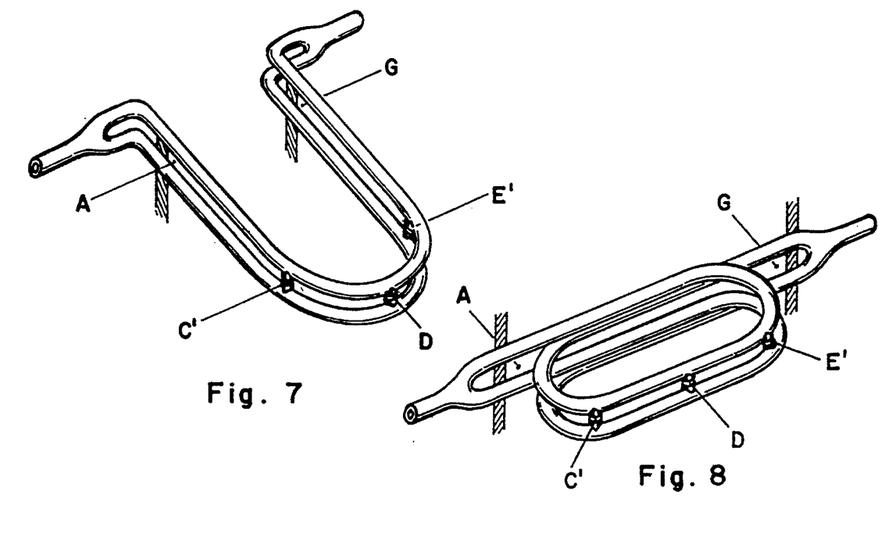
FIG. 7 illustrates a conventional design of the mass flowmeter employing a pair of U-shaped tubes, that can be operated on the principles of the present invention.
FIG. 8 illustrates a conventional design of the mass flowmeter employing a pair of looped conduits, that can be operated on the principles of the present invention.

In FIG. 6 there is illustrated the distributions of the symmetric primary flexural vibration of the conduit generated by the electromagnetic vibrator, and the antisymmetric secondary flexural vibration of the conduit generated by the convective inertia force of media moving through the conduit.

It can be easily shown by simultaneously solving the equations of motions of a conduit under flexural vibration and of media moving through the conduit that the flexural vibration of a conduit created by a combined effect of an electromagnetic vibrator exerting a vibratory force on the conduit and the inertia force of the media moving through the conduit is described by the following equation:

$$v(x,t) = v_0(x)\cos\omega t + \frac{\dot{M}}{EI} v_1(x)\sin\omega t, \quad (1)$$

where $v(x,t)$ is the velocity of the flexural vibration of the conduit at a section at a distance x from the midsection D of the conduit and at time t, $\omega$ is the circular frequency of the flexural vibration of the conduit, M is the mass flow rate of media moving through the conduit, E is the modulus of elasticity of the material making up the conduit, I is the moment of inertia of the cross sectional area of the conduit, $v_0(x)\cos\omega t$ is the primary flexural vibration of the conduit created by the electromagnetic vibrator, and $(M/EI) V_1(x) \sin \omega t$ is the secondary flexural vibration of the conduit created by the dynamic interaction between the primary flexural vibration of the conduit and the convective motion of the media moving through the conduit; wherein $v_1(x)$ is related to $V_0(x)$ by the following differential equation:

$$\frac{d^4 v_1(x)}{dx^4} - \frac{m + \rho S}{EI}\omega^2 v_1(x) = -\omega \frac{dv_0(x)}{dx}, \quad (2)$$

where m is the mass of the conduit per unit length thereof, $\rho$ is the density of the media moving through the conduit, and S is the cross sectional area of the flow passage provided by the conduit. When the conduit containing the moving media is flexurally vibrated at a natural frequency thereof, which natural frequency is give by equation $$\omega = K\sqrt{\frac{EI}{m + \rho S}}, \quad (3)$$

the equation (2) reduces to the following form:

$$\frac{d^4 v_1(x)}{dx^4} - K^2 v_1(x) = -\omega \frac{dv_0(x)}{dx}, \quad (4)$$

where K is a characteristic constant determined by the boundary conditions of the vibrating conduit. By using the addition or subtraction formula of the trigonometric functions, it can be easily shown that equation (1) can be written in the form $$v(x,t) = A(x)\{\cos[\omega t - \phi(x)]\}, \quad (5)$$

where $$A(x) = \sqrt{[v_0(x)]^2 + \left[\frac{\dot{M}}{EI} v_1(x)\right]^2}, \quad (6)$$

and $$\tan\phi(x) = \frac{v_1(x)}{v_0(x)} \frac{\dot{M}}{EI}. \quad (7)$$

Two motion sensors respectively located at x=a and x=b provide two alternating electrical signals respectively proportional to v(x,t) given by equation (5) wherein x therein is now substituted with a and b, which two alternating electrical signals are of the following forms:

$$E_a(t) = \alpha A_a \cos(\omega t - \phi_a), \quad (8)$$

and $$E_b(t) = \beta A_b \cos(\omega t - \phi_b), \quad (9)$$

where $\alpha$ and $\beta$ are respectively the electrical amplification coefficients of the two motion sensors. It should be understood that the equations (1) through (9) are valid for all modes of the flexural vibration of the conduit which may be symmetric, antisymmetric or asymmetric about the midsection D of the conduit. The equations (8) and (9) satisfy the following relationships:

$$E_a(t) = \alpha A_a \sin(\phi_a - \phi_b) \text{ when } E_b(t) \text{ reaches a zero value,} \quad (10)$$

and $$E_a(t) = \alpha A_a \cos(\phi_a - \phi_b) \text{ when } E_b(t) \text{ reaches a peak value.} \quad (11)$$

The ratio of equation (10) to equation (11) provides equation $$\frac{E_a(t)|E_b(t) = 0}{E_a(t)|E_b(t) = \text{PEAK}} = \tan(\phi_a - \phi_b). \quad (12)$$

When equations (7) and (12) are combined to eliminate $\tan\phi(x)$, the following equation results:

$$M = C\frac{E_a(t)|E_b(t) = 0}{E_a(t)|E_b(t) = \text{PEAK}}, \quad (13)$$

where $$C = EI/\left[\frac{v_1(a)}{v_0(a)} - \frac{v_1(b)}{v_0(b)}\right]. \quad (14)$$

According to equation (13), the mass flow rate of media moving through the vibrating conduit can be determined as a function of the ratio of a first value of one of the two alternating electrical signals measured at a first instant when the other of the two alternating electrical signals reaches a zero value to a second value of said one of the two alternating electrical signals measured at a second instant when said the other of the two alternating electrical signals reaches a peak value. The equation (10) can be written in the form $$\frac{E_a(t)|E_b(t) = 0}{Amp \cdot E_a(t)} = \sin(\phi_a - \phi_b), \quad (15)$$

where Amp.$E_a(t)$ stands for the amplitude of $E_a(t)$. In most cases of mass flow measurement, the phase angle difference $(\phi_a - \phi_b)$ is less than five to ten degrees and $\sin(\phi_a - \phi_b)$ can be approximated by $\tan(\phi_a - \phi_b)$, and consequently, equation (15) can be written in the following approximate form:

$$\frac{E_a(t)|E_b(t) = 0}{Amp \cdot E_a(t)} = \tan(\phi_a - \phi_b). \quad (16)$$

When equations (7) and (16) are combined to eliminate $\tan \phi(x)$, the following approximate form of equation (13) is obtained:

$$M = C \frac{E_a(t)|E_b(t) = 0}{Amp \cdot E_a(t)}, \quad (17)$$

where the constant of proportionality C given by Equation (14) is determined empirically in using equation (17). According to equation (17), the mass flow rate of media moving through the vibrating conduit can be determined as a function of the ratio of a value of one of the two alternating electrical signals measured at an instant when the other of the two alternating electrical signals reaches a zero value to the amplitude of said one of the two alternating electrical signals.

It can be readily discovered that equations (8) and (9) satisfy the following relationships:

$$\dot{E}_a(t)E_b(t) - E_a(t)\dot{E}_b(t) = \omega \alpha \beta A_a A_b \sin(\phi_a - \phi_b), \quad (18)$$

and $$\dot{E}_a(t)\dot{E}_b(t) + \omega^2 E_a(t)E_b(t) = \omega^2 \alpha \beta A_a A_b \cos(\phi_a - \phi_b), \quad (19)$$

where $\dot{E}_a(t)$ and $\dot{E}_b(t)$ respectively stand for the time derivatives of $E_a(t)$ and $E_b(t)$. The ratio of equation (18) to equation (19) yields a relationship $$\frac{\dot{E}_a(t)E_b(t) - E_a(t)\dot{E}_b(t)}{\frac{1}{\omega}\dot{E}_a(t)\dot{E}_b(t) + \omega E_a(t)E_b(t)} = \tan(\phi_a - \phi_b). \quad (20)$$

When equations (7) and (20) are combined to eliminate $\tan(\phi_a - \phi_b)$, the following equation results:

$$M = C \frac{\dot{E}_a(t)E_b(t) - E_a(t)\dot{E}_b(t)}{\frac{1}{\omega}\dot{E}_a(t)\dot{E}_b(t) + \omega E_a(t)E_b(t)}. \quad (21)$$

According to equation (21), the mass flow rate of media moving through the vibrating conduit can be determined as a function of the ratio of a differential combination of a product between the first alternating electrical signal and the time derivative of the second alternating electrical signal and a product between the second alternating electrical signal and the time derivative of the first alternating electrical signal to an additive combination of a product between the time derivatives of the first and second alternating electrical signals divided by the circular frequency of the first and second alternating electrical signals and a product between the first and second alternating electrical signals times the circular frequency of the first and second alternating electrical signals. When $\sin(\phi_a - \phi_b)$ appearing on the right hand side of equation (18) is approximated by $\tan(\phi_a - \phi_b)$ and use of equation (7) is made to eliminate $\tan(\phi_a - \phi_b)$, the following approximate form of equation (21) is obtained:

$$M = C \frac{\dot{E}_a(t)E_b(t) - E_a(t)\dot{E}_b(t)}{\omega[Amp \cdot E_a(t)][Amp \cdot E_b(t)]}. \quad (22)$$

According to equation (22), the mass flow rate of media moving through the vibrating conduit can be determined as a function of the ratio of a differential combination of a product between the first alternating electrical signal and the time derivative of the second alternating electrical signal and a product between the second alternating electrical signal and the time derivative of the first alternating electrical signal to a product between the amplitudes of the first and second alternating electrical signals.

When the two motion sensors respectively generating the two alternating electrical signals given by equations (8) and (9) are located symmetrically about the midsection of the vibrating conduit, $\phi_a = -\phi_b = \phi$, equations (8) and (9) satisfy the following relationships:

$$e_a(t) - e_b(t) = 2 \sin \omega t \sin \phi, \quad (23)$$

and $$e_a(t) + e_b(t) = 2 \cos \omega t \cos \phi, \quad (24)$$

where $e_a(t)$ and $e_b(t)$ respectively stand for the normalized form of $E_a(t)$ and $E_b(t)$, where the normalized form of an alternating electrical signal is obtained by dividing the alternating electrical signal with the amplitude of the alternating electrical signal. The ratio of equation (23) to equation (24) provides the relationship $$\frac{Amp \cdot [e_a(t) - e_b(t)]}{Amp \cdot [e_a(t) + e_b(t)]} = \tan \phi. \quad (25)$$

When equations (7) and (25) are combined to eliminate $\tan(x)$, the following equation results:

$$M = C \frac{Amp \cdot [|e_a(t)| - |e_b(t)|]}{Amp \cdot [|e_a(t)| + |e_b(t)|]}, \quad (26)$$

where the absolute values $|e_a(t)|$ and $|e_b(t)|$ are employed, whereby equation (26) is valid for the vibrating conduit under a flexural vibration of a symmetric mode as well as an antisymmetric mode about the midsection of the vibrating conduit. The absolute value of an alternating electrical signal or the positive form of an alternating electrical signal is equal to the alternating electrical signal when the alternating electrical signal is positive and equal to minus one times the alternating electrical signal when the alternating electrical signal is negative and is obtained in the form of the square root of the square of the alternating electrical signal. According to equation (26), the mass flow rate of media moving through the vibrating conduit can be determined as a function of the ratio of the amplitude of a differential combination of the absolute values of the normalized first and second alternating electrical signals to the amplitude of an additive combination of the absolute values of the normalized first and second alternating electrical signals. The differential combination of two alternating electrical signals is defined as a difference between a constant times the first alternating electrical signal and another constant times the second alternating electrical signal, and is obtained by merging the first alternating electrical signal and inverted form of the second alternating electrical signal through an electronic addition circuit. The additive combination of two alternating electrical signals is defined as a sum of a constant times the first alternating electrical signal and another constant times the second alternating electrical signal, and is obtained by merging the first and second alternating electrical signals through an electronic addition circuit. The equation (23) provides the relationship $$\text{Amp.}[e_a(t) - e_b(t)] = 2 \sin \phi. \tag{27}$$

When sin $\phi$ appearing on the right hand side of equation (27) is approximated by tan $\phi$ and use of equation (7) is made to eliminate tan $\phi$ (x), the following equation results:

$$M = \frac{C}{2} \text{Amp} \cdot [|e_a(t)| - |e_b(t)|]. \tag{28}$$

According to equation (28), the mass flow rate of media moving through the vibrating conduit can be determined as a function of the amplitude of a differential combination of the absolute values of the normalized first and second alternating electrical signals.

When the two motion sensors respectively generating the two alternating electrical signals given by equations (8) and (9) are located symmetrically about the midsection of the vibrating conduit, and $\phi_a = -\phi_b = \phi$, equations (8) and (9) satisfy the following relationships:

$$[e_a(t)]^2 - [e_b(t)]^2 = \sin 2\omega t \sin 2\phi, \tag{29}$$

and $$e_a(t)\dot{e}_b(t) + \dot{e}_a(t)e_b(t) = \omega \sin 2\omega t. \tag{30}$$

The ratio of equation (29) to equation (30) yields the relationship $$\frac{[e_a(t)]^2 - [e_b(t)]^2}{e_a(t)\dot{e}_b(t) + \dot{e}_a(t)e_b(t)} = \frac{1}{\omega} \sin 2\phi. \tag{31}$$

When sin $2\phi$ appearing on the right hand side of equation (31) is approximated by tan $2\phi$ and use of equation (7) is made to eliminate tan $2\phi$, the following equation results:

$$M = \frac{C\omega}{2} \frac{[e_a(t)]^2 - [e_b(t)]^2}{e_a(t)\dot{e}_b(t) + \dot{e}_a(t)e_b(t)}. \tag{32}$$

According to equation (32), the mass flow rate of media moving through the vibrating conduit can be determined as a function of the ratio of a differential combination of the square of the normalized first and second alternating electrical signals to an additive combination of a product between the first alternating electrical signal and the time derivative of the second alternating electrical signal and a product between the second alternating electrical signal and the time derivative of the first alternating electrical signal, which additive combination is equal to the time derivative of the product between the first and second alternating electrical signals. It is readily recognized that equation (29) yields the relationship $$\text{Amp.}\{[e_a(t)]^2 - [e_b(t)]^2\} = \sin 2\phi. \tag{33}$$

When sin $2\phi$ appearing on the right hand side of equation (33) is approximated by tan $2\phi$ and use of equation (7) is made to eliminate tan $2\phi$, the following equation results $$M = \frac{C}{2} \text{Amp} \cdot \{[e_a(t)]^2 - [e_b(t)]^2\}. \tag{34}$$

According to equation (34), the mass flow rate of media moving through the vibrating conduit can be determined as a function of the amplitude of a differential combination of the squares of the normalized first and second alternating electrical signals.

In FIGS. 7-11, there are illustrated some representative examples of the existing versions of the Coriolis force mass flowmeter, that employs the principles of the symmetric primary flexural vibration and the antisymmetric secondary flexural vibration of the conduit. All of these versions of the mass flowmeter can be operated on the data processing methods of the present invention and benefit thereby in terms of reduced capital cost and improved operating performance.

Figures 9, 10, 11, 12, 13, 14:
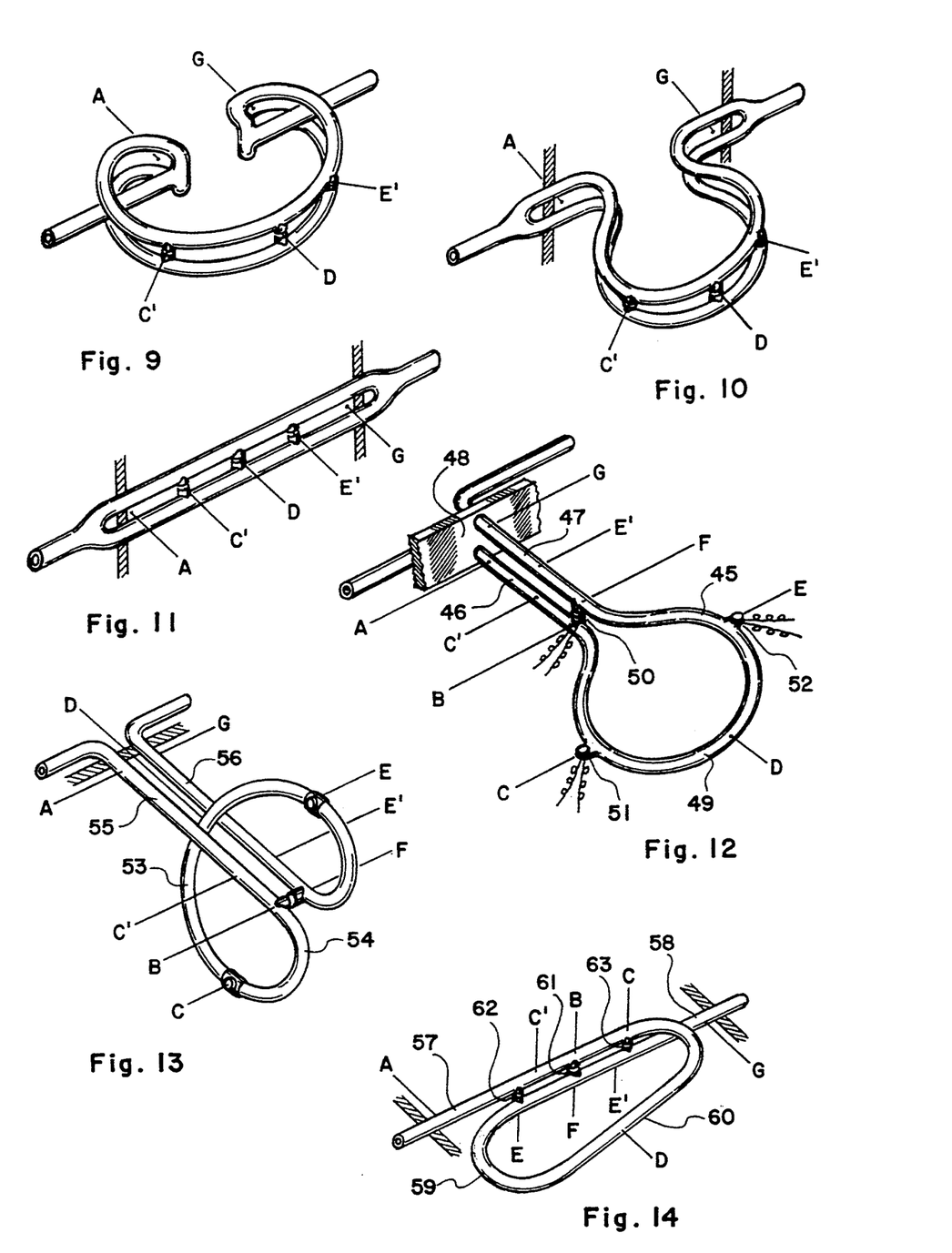
FIG. 9 illustrates a conventional design of the mass flowmeter employing a pair of Cardioid shaped conduits, that can be operated on the principles of the present invention.
FIG. 10 illustrates a conventional design of the mass flowmeter employing a pair of Omega shaped conduits, that can be operated on the principles of the present invention.
FIG. 11 illustrates a conventional design of the mass flowmeter employing a pair of straight conduits, that can be operated on the principles of the present invention.
FIG. 12 illustrates an embodiment of the mass flowmeter with a single conduit under an antisymmetric primary flexural vibration generated by an electromagnetic vibrator and a symmetric secondary flexural vibration generated by the convective inertia force of media moving through the conduit.
FIG. 13 illustrates another embodiment of the mass flowmeter operating in the same mode as that shown in FIG. 12.
FIG. 14 illustrates a further embodiment of the mass flowmeter operating in the same mode as that shown in FIG. 12.

In FIG. 12 there is illustrated an embodiment of the mass flowmeter comprising a single conduit 45 including two generally straight end sections 46 and 47 disposed on a first plane and anchored to a supporting structure 48 at the roots A and G thereof, and a looped midsection 49 of 360 degree loop angle disposed on a second plane approximately perpendicular to the first plane including the two generally straight end sections 46 and 47 of the conduit 45. The electromagnetic vibrator 50 with two opposite halves respectively secured to the over-hanging extremities B and F of the two generally straight end sections 46 and 47, flexurally vibrates the two opposite halves of the conduit 45 in two opposite directions parallel to the first plane including the two generally straight end sections 46 and 47 and perpendicular to the two generally straight end sections 46 and 47 of the conduit 45. The two motion sensors 51 and 52 of the accelerometer type or piezo electric vibrometer type respectively disposed at two sections C and E belonging to the two opposite halves of the conduit 45 in a symmetric relationship about the midsection D of the conduit provide the first and second electrical signals respectively given by the equations (8) and (9). The conduit 45 experiences an antisymmetric primary flexural vibration generated by the electromagnetic vibrator 50 and a symmetric secondary flexural vibration generated by the convective inertia force of media moving through the conduit 45. In a revised version of the embodiment shown in FIG. 12, the two motion sensors 51 and 52 can be respectively relocated to new section C' and E' respectively belonging to the two generally straight end sections 46 and 47 of the conduit 45. The mass flowmeter employing a single conduit provides an advantage over the mass flowmeters employing a pair of conduits in terms of the capital cost and operating performance, as the single conduit construction is much less expensive compared with the dual conduit construction, and the single conduit design displays a greater Coriolis force effect compared with the dual conduit construction bifurcating the media flow.

In FIG. 13 there is illustrated another embodiment of a single conduit mass flowmeter, that is a modified version of the embodiment shown in FIG. 12. While the looped midsection 49 connected to the over-hanging extremities of the two generally straight end sections 46 and 47 of the conduit, extends away from the two anchored extremities A and G of the conduit 45 in the embodiment shown in FIG. 12, the looped midsection 53 of the conduit 54 extends towards the two anchored extremities A and G of the conduit 54 and passes through a space between the two generally straight end sections 55 and 56 of the conduit 54. In a revised version, the two motion sensors may be relocated from the existing positions C and E to the new positions C' and E'.

In FIG. 14 there is illustrated a further embodiment of the single conduit mass flowmeter wherein the two generally straight end sections 57 and 58 of the conduit 59 extends from the looped midsection 60 of 360 degree loop angle in two opposite directions in a tangential relationship to the looped midsection 60. The electromagnetic vibrator 61 is disposed on the plane of symmetry intersecting the midsection D of the conduit and perpendicular to the two generally straight end sections 57 and 58 of the conduit 59. A pair of relative motion sensors 62 and 63 measuring relative flexural vibration between the two generally straight end sections 57 of the conduit 59 are disposed symmetrically about the plane of symmetry including the electromagnetic vibrator 61 and the midsection D of the conduit 59. In a revised version of the embodiment, the two relative motion sensors 62 and 67 may be replaced by two vibration sensors of the accelerometer type, which are now included respectively in the two opposite halves of the looped midsection of the conduit 59 in a symmetric relationship about the midsection D of the conduit 59, or in two new sections C' and E' respectively belonging to the two generally straight end sections 57 and 58 of the conduit 59.

Figure 15:
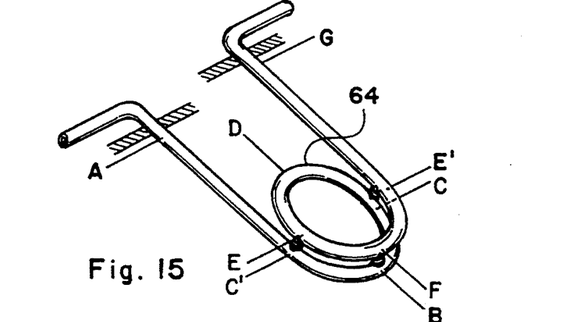
FIG. 15 illustrates yet another embodiment of the mass flowmeter operating in the same mode as that shown in FIG. 12.

In FIG. 15 there is illustrated yet another embodiment of the single conduit mass flowmeter, that is the modified version of the embodiment shown in FIG. 14, wherein this embodiment has the looped midsection 64 of 540 degree loop angle instead of the 360 degree loop angle employed in the embodiment shown in FIG. 14.

Figure 16:
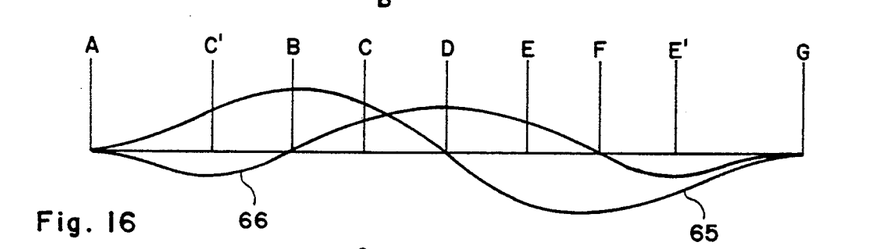
FIG. 16 illustrates the distributions of the antisymmetric primary flexural vibration of the conduit generated by the electromagnetic vibrator and the symmetric secondary flexural vibration of the conduit generated by the convective inertia force of the media moving through the conduit.

In FIG. 16 there is illustrated the distributions of the antisymmetric primary flexural vibration of the conduit generated by the electromagnetic vibrator, that is represented by the antisymmetric curve 65, and the symmetric secondary flexural vibration generated by the convective inertia force of media moving through the conduit, that is represented by the symmetric curve 66, which combination of the flexural vibrations is experienced by the conduits included in the mass flowmeters shown in FIGS. 12-15.

As the single conduit included in the mass flowmeters shown in FIGS. 12-15 is flexurally vibrated in a mode having the antisymmetric primary flexural vibration and the symmetric secondary flexural vibration, the phase angle $\phi$ appearing in the equations (7), (8) and (9) must be changed to $(\phi + \pi/2)$. An useful embodiment of the installation of the two motion sensors in the mass flowmeters shown in FIGS. 12-15 is to install an absolute motion sensor at the midsection D of the conduit and a relative motion sensor adjacent to the electromagnetic vibrator on the plane of symmetry For example, the two opposite halves of the relative motion sensor can be respectively secured to the sections C' and E' respectively belonging to the two generally straight end sections of the conduit shown in FIGS. 12 and 13. The two electric signals respectively provided by the absolute motion sensor located at the midsection D of the conduit and by the relative motion sensor measuring the relative flexural vibration between the two generally straight end sections of the conduit are respectively given by equations $$E_0(t) = \alpha A_0 \sin \omega t, \quad (35)$$

and $$E_b(t) = 2\beta A_b \sin(\omega t - \phi_b). \quad (36)$$

The mass flow rate of media moving through the conduit is related to the phase angle difference between the two electrical signals respectively provided by the absolute motion sensor and the relative motion sensor by the following equation:

$$M = C \cot \phi_b, \quad (37)$$

where the constant C is equal to $$C = \frac{v_0(b)}{v_1(b)} EI. \quad (38)$$

According to the equation (38), the mass flow rate of media moving through the conduit under the antisymmetric primary flexural vibration and the symmetric secondary flexural vibration can be determined as a function of the phase angle difference between two electrical signals respectively provided by an absolute motion sensor disposed at the midsection of the conduit and a relative motion sensor measuring the relative flexural vibration between the two generally straight end sections of the conduit.

Figures 17, 18, 19:
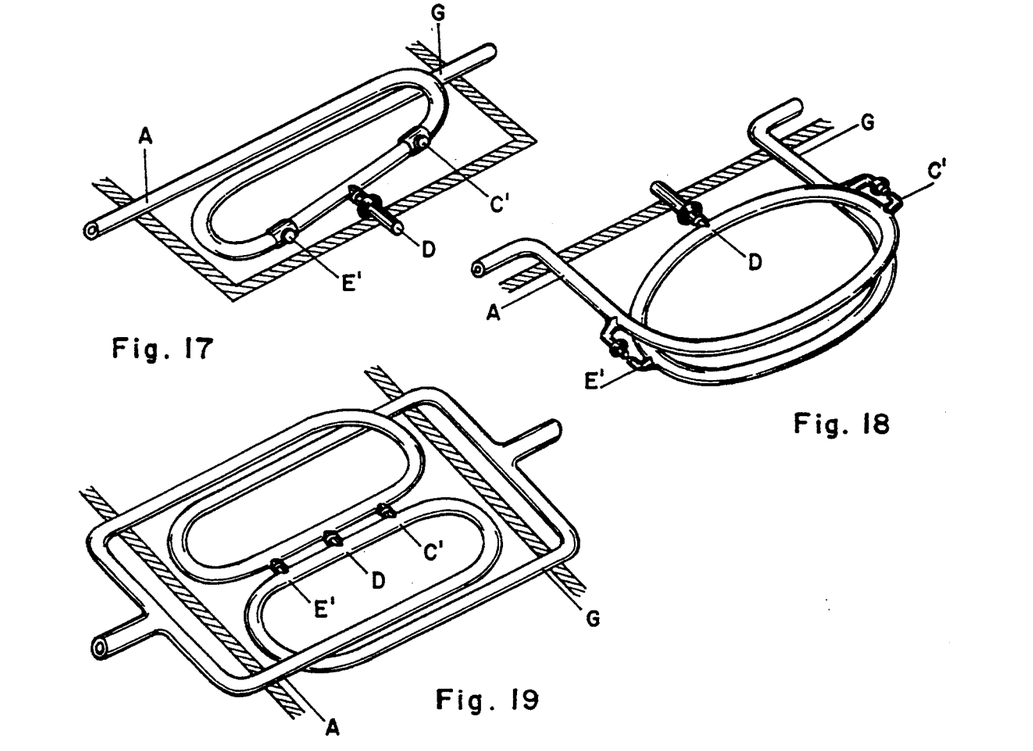
FIG. 17 illustrates an additional embodiment of the mass flowmeter, that can be operated on the principles of the present invention.
FIG. 18 illustrates another additional embodiment of the mass flowmeter, that can be operated on the principles of the present invention.
FIG. 19 illustrates a further additional embodiment of the mass flowmeter, that can be operated on the principles of the present invention.

In FIGS. 17 through 19, there are illustrated additional embodiments of the mass flowmeter, which can also be operated on the principles taught by the methods of the present invention. In these embodiments, the electromagnetic vibrator disposed on the plane of symmetry including the midsection D of the conduit vibrates the conduit or conduits in directions substantially parallel to a plane substantially including the looped midsection of the conduit and perpendicular to the midportion of the conduit including the midsection D of the conduit. The two motion sensors respectively disposed on two sections C' and E' in a symmetric relationship with respect to the midsection D of the conduit provide the first and second electrical signals respectively given by the equations (8) and (9).

While the principles of the inventions have now been made clear by the illustrative equations, there will be many modifications in the arrangement of the equations, terms and grouping of the terms in the equations and approximate forms of the equations, which are immediately obvious to those skilled in the art and particularly adapted to the specific working environments and operating conditions without departing from those principles in the practice of the invention. It is not desired to limit the inventions to the particular illustrative equations shown and described and accordingly, all suitable modifications and equivalents of the equations may be regarded as falling within the scope of the inventions as defined by the claims which follow.

The embodiments of the inventions, in which an exclusive property or privilege is claimed, are defined as follows:

1. A method for determining mass flow rate of media moving through ar least one conduit under a flexural vibration comprising in combination:
   a) generating a primary flexural vibration of the conduit in one of symmetric and antisymmetric modes about a midsection of the conduit by exerting a vibratory force onto the conduit;
   b) obtaining a first alternating electrical signal representing the flexural vibration of the conduit at a first section of the conduit, and a second alternating electrical signal representing the flexural vibration of the conduit at a second section of the conduit;
   c) taking a value of the first alternating electrical signal measured at an instant when the second alternating electrical signal reaches a zero value; and
   d) determining mass flow rate of media moving through the conduit as a function of said value of the first alternating electrical signal.

2. A method as defined in claim 1 wherein the mass flow rate of media moving through the conduit is determined as a function of a ratio of said value of the first alternating electrical signal to an amplitude of the first alternating electrical signal.

3. A method for determining mass flow rate of media moving through at least one conduit under a flexural vibration comprising in combination:
   a) generating a primary flexural vibration of the conduit in one of symmetric and antisymmetric modes about a midsection of the conduit by exerting a vibratory force onto the conduit;
   b) obtaining a first alternating electrical signal representing the flexural vibration of the conduit at a first section of the conduit, and a second alternating electrical signal representing the flexural vibration of the conduit at a second section of the conduit;
   c) forming a differential combination of a product between the first alternating electrical signal and time derivative of the second alternating electrical signal, and a product between the second alternating electrical signal and time derivative of the first alternating electrical signal, said differential combination being a difference between a first constant times the product between the first alternating electrical signal and the time derivative of the second alternating electrical signal, and a second constant times the product between the second alternating electrical signal and the time derivative of the first alternating electrical signal; and
   d) determining mass flow rate of media moving through the conduit as a function of said differential combination of the products between the first and second alternating electrical signals.

4. A method as defined in claim 3 wherein the mass flow rate of media moving through the conduit is determined as a function of a ratio of said differential combination of the products between the first and second alternating electrical signals to a product between amplitudes of the first and second alternating electrical signals.

5. A method for determining mass flow rate of media moving through at least one conduit under a flexural vibration comprising in combination:
   a) generating a primary flexural vibration of the conduit in one of symmetric and antisymmetric modes about a midsection of the conduit by exerting a vibratory force onto the conduit;
   b) obtaining a first alternating electrical signal representing the flexural vibration of the conduit at a first section of the conduit, and a second alternating electrical signal representing the flexural vibration of the conduit at a second section of the conduit;
   c) forming a differential combination of the first and second alternating electrical signals, said differential combination being a difference between a first constant times the first alternating electrical signal and a second constant times the second alternating electrical signal;
   d) measuring an amplitude of the differential combination of the first and second alternating electrical signals; and
   e) determining mass flow rate of media moving through the conduit as a function of the amplitude of said differential combination of the first and second alternating electrical signals.

6. A method as defined in claim 5 wherein said differential combination of the first and second alternating electrical signals is obtained by forming a differential combination of a positive form of the first alternating electrical signal and a positive form of the second alternating electrical signal, the positive form of an alternating electrical signal being equal to the alternating electrical signal when the alternating electrical signal is positive and equal to minus one times the alternating electrical signal when the alternating electrical signal is negative, and said differential combination of the positive form of the first alternating electrical signal and the positive form of the second alternating electrical signal being a difference between a first constant times the positive form of the first alternating electrical signal and a second constant times the positive form of the second alternating electrical signal.

7. A method as defined in claim 5 wherein said differential combination of the first and second alternating electrical signals is obtained by forming a differential combination of a normalized form of the first alternating electrical signal and a normalized form of the second alternating electrical signal, the normalized form of an alternating electrical signal being equal to the alternating electrical signal divided by an amplitude of the alternating electrical signal, and said differential combination of the normalized form of the first alternating electrical signal and the normalized form of the second alternating electrical signal being equal to a difference between a first constant times the normalized form of the first alternating electrical signal and a second constant times the normalized form of the second alternating electrical signal.

8. A method as defined in claim 7 wherein said differential combination of the normalized forms of the first and second alternating electrical signals is obtained by forming a differential combination of a positive form of the normalized form of the first alternating electrical signal and a positive form of the normalized form of the second alternating electrical signal, the positive form of the normalized form of an alternating electrical signal being equal to the normalized form of the alternating electrical signal when the normalized form of the first alternating electrical signal is positive and equal to minus one times the normalized form of the alternating signal when the normalized form of the alternating electrical signal is negative, and said differential combination of the positive forms of the normalized forms of the first and second alternating electrical signals being equal to a difference between a first constant times the positive form of the normalized form of the first alternating electrical signal and a second constant times the positive form of the normalized form of the second alternating electrical signal.

9. A method for determining mass flow rate of media moving through at least one conduit under a flexural vibration comprising in combination:
   a) generating a primary flexural vibration of the conduit in one of symmetric and antisymmetric modes about a midsection of the conduit by exerting a vibratory force onto the conduit
   b) obtaining a first alternating electrical signal representing the flexural vibration of the conduit at a first section of the conduit, and a second alternating electrical signal representing the flexural vibration of the conduit at a second section of the conduit;
   c) forming a differential combination of square of the first alternating electrical signal and square of the second alternating electrical signal, said differential combination of the squares of first and second alternating electrical signals being equal to a difference between a first constant times the square of the first alternating electrical signal and a second constant times the square of the second alternating electrical signal;
   d) measuring an amplitude of the differential combination of the squares of the first and second alternating electrical signals; and
   e) determining mass flow rate of media moving through the conduit as a function of the amplitude of said differential combination of the squares of the first and second alternating electrical signals.

10. A method as defined in claim 9 wherein said differential combination of the squares of the first and second alternating electrical signals is obtained by forming a differential combination of square of a normalized form of the first alternating electrical signal and square of a normalized form of the second alternating electrical signal, the normalized form of an alternating electrical signal being equal to the alternating electrical signal divided by an amplitude of the alternating electrical signal, and said differential combination of the squares of the normalized forms of the first and second alternating electrical signals being equal to a first constant times the square of the normalized form of the first alternating electrical signal and a second constant times the square of the normalized form of the second alternating electrical signal.

* * * * *